United States Patent
Arai

(10) Patent No.: US 7,068,318 B2
(45) Date of Patent: Jun. 27, 2006

(54) DIAPHRAGM CONTROL APPARATUS FOR LENS OF CCTV CAMERA

(75) Inventor: Masayuki Arai, Tokyo (JP)

(73) Assignee: PENTAX Corporation, Tokyo (JP)

( * ) Notice: Subject to any disclaimer, the term of this patent is extended or adjusted under 35 U.S.C. 154(b) by 834 days.

(21) Appl. No.: 09/725,125

(22) Filed: Nov. 29, 2000

(65) Prior Publication Data

US 2001/0002849 A1    Jun. 7, 2001

(30) Foreign Application Priority Data

Dec. 2, 1999   (JP) ................................ 11-343467

(51) Int. Cl.
*H04N 5/232* (2006.01)
*H04N 5/235* (2006.01)

(52) U.S. Cl. ................... 348/362; 348/211.99

(58) Field of Classification Search ........... 348/211.99, 348/362, 363, 364, 365, 366; 396/238, 257
See application file for complete search history.

(56) References Cited

U.S. PATENT DOCUMENTS

| 4,410,915 A | * | 10/1983 | Yamamoto | ................... | 348/363 |
| 4,562,477 A | | 12/1985 | Ogasawara et al. | ......... | 348/364 |
| 4,651,216 A | * | 3/1987 | Arai et al. | ................... | 348/364 |
| 5,325,149 A | * | 6/1994 | Kawahara | ................... | 396/259 |
| 5,495,245 A | * | 2/1996 | Ashe | ........................... | 341/145 |
| 6,201,491 B1 | * | 3/2001 | Brunolli et al. | ............. | 341/144 |

FOREIGN PATENT DOCUMENTS

JP    06268902 A  *  9/1994

* cited by examiner

*Primary Examiner*—David Ometz
*Assistant Examiner*—Timothy J. Henn
(74) *Attorney, Agent, or Firm*—Greenblum & Bernstein, P.L.C.

(57) ABSTRACT

A diaphragm control apparatus for a lens of a CCTV camera having a diaphragm driver for opening or closing a diaphragm in accordance with a diaphragm control signal, includes a remote diaphragm controller which outputs a remote diaphragm control signal to set an optional diaphragm position, a diaphragm control signal setting device which sets a diaphragm control signal in accordance with the remote diaphragm control signal and which outputs the diaphragm control signal to the diaphragm driver to move the diaphragm to a diaphragm position corresponding to the diaphragm control signal, and a power source which supplies power to the diaphragm control signal setting device. The diaphragm control signal setting device is provided with a memory for storing the diaphragm control signal when the power supply is interrupted, so that the diaphragm control signal which has been set at the interruption of the power supply can be output when the power supply is carried out again.

4 Claims, 3 Drawing Sheets

DIAPHRAGM CONTROL APPARATUS FOR LENS OF CCTV CAMERA

BACKGROUND OF THE INVENTION

1. Field of the Invention

The present invention relates to a diaphragm control apparatus for a lens of a CCTV (Closed Circuit Television) camera, wherein the control can be switched between an automatic control mode and a remote control mode.

2. Description of the Related Art

In a known diaphragm control apparatus for a lens of a CCTV camera, in which a movable magnet servo meter or movable coil servo meter is used as a diaphragm driving source, an automatic control in which the diaphragm is automatically controlled in accordance with an image signal sent from the CCTV camera and a remote control in which the diaphragm can be remotely set at an optional position, regardless of the image signal from the CCTV camera, can be optionally selected depending on the conditions of use.

In the remote control mode, a control signal is supplied to a drive meter of a servo meter from an external remote controller to control the diaphragm so as to set an optional diaphragm position regardless of the image signal from the CCTV camera, and a position detection signal output from a position detection device of the servo meter is fed back to the drive meter to hold the diaphragm in the selected position.

However, since the diaphragm is electrically controlled, if electricity supply from the CCTV camera is interrupted, it is impossible to hold the diaphragm at an optional position, so that the diaphragm is returned to a predetermined initial position. Consequently, a user must troublesomely reset the diaphragm each time the power source is turned ON.

SUMMARY OF THE INVENTION

It is an object of the present invention to provide a diaphragm control apparatus for a lens of a CCTV camera in which the diaphragm of a lens can be automatically returned to a stop position at the interruption of electric power when the power supply is turned ON again.

According to the present invention, a diaphragm control apparatus for a lens of a CCTV camera is provided having a diaphragm driving device for one of opening and closing a diaphragm in accordance with a diaphragm control signal, including a remote diaphragm control device for outputting a remote diaphragm control signal which is adapted to set an optional diaphragm position; a diaphragm control signal setting device for setting a diaphragm control signal in accordance with the remote diaphragm control signal and for outputting the diaphragm control signal to the diaphragm driving device to thereby move the diaphragm to a diaphragm position corresponding to the diaphragm control signal; and a power source for supplying power to the diaphragm control signal setting device. The diaphragm control signal setting device being provided with a memory for storing the diaphragm control signal when the power supply is interrupted, so that the diaphragm control signal which has been set at the interruption of the power supply can be output when the power supply is supplied again.

With this arrangement, if the power supply from the power source is interrupted, the diaphragm control signal same as that set at the interruption of the power supply can be output when the power is supplied again. Consequently, the diaphragm can be automatically returned to the position at the interruption of the power supply.

Preferably, the diaphragm control signal setting device includes a digital potentiometer and the memory. When the remote diaphragm control signal is input when the power supply is supplied, the digital potentiometer varies a wiper position of a variable resistor and outputs the remote diaphragm control signal corresponding to the wiper position.

In an embodiment, the digital potentiometer maintains the wiper position of the variable resistor when the supply of the remote diaphragm control signal is stopped, rewrites and stores a value corresponding to the wiper position in the memory, holds the corresponding value stored in the memory when the power supply is interrupted, reads the corresponding value from the memory when the power supply is recommenced, and outputs the remote diaphragm control signal corresponding thereto.

With this structure, the value corresponding to the wiper position of the variable resistor of the digital potentiometer is not varied even if the power supply from the power source is interrupted. When the power supply is recommenced, the remote diaphragm control signal stored by the digital potentiometer is supplied to the diaphragm driving device, and hence the diaphragm of the lens can be automatically returned to the diaphragm position at the interruption of the power supply.

Preferably, the memory is a non-volatile memory.

In an embodiment, the remote diaphragm control device is provided separately from the CCTV camera.

In an embodiment, the CCTV camera lens includes an automatic control device for outputting a diaphragm control signal based on an image signal of the CCTV camera to the diaphragm driving device to thereby automatically control the diaphragm, and a switching device for switching an automatic diaphragm control in which the diaphragm is automatically controlled by the automatic control device and a remote diaphragm control in which the diaphragm is controlled by the remote diaphragm control device, the remote diaphragm control device being provided with a switching signal output device for operating the switching device.

The present disclosure relates to subject matter contained in Japanese Patent Application No. 11-343467 (filed on Dec. 2, 1999) which is expressly incorporated herein by reference in its entirety.

BRIEF DESCRIPTION OF THE DRAWINGS

The invention will be discussed below with reference to the accompanying drawings, in which.

DESCRIPTION OF THE PREFERRED EMBODIMENTS

Figure 1:
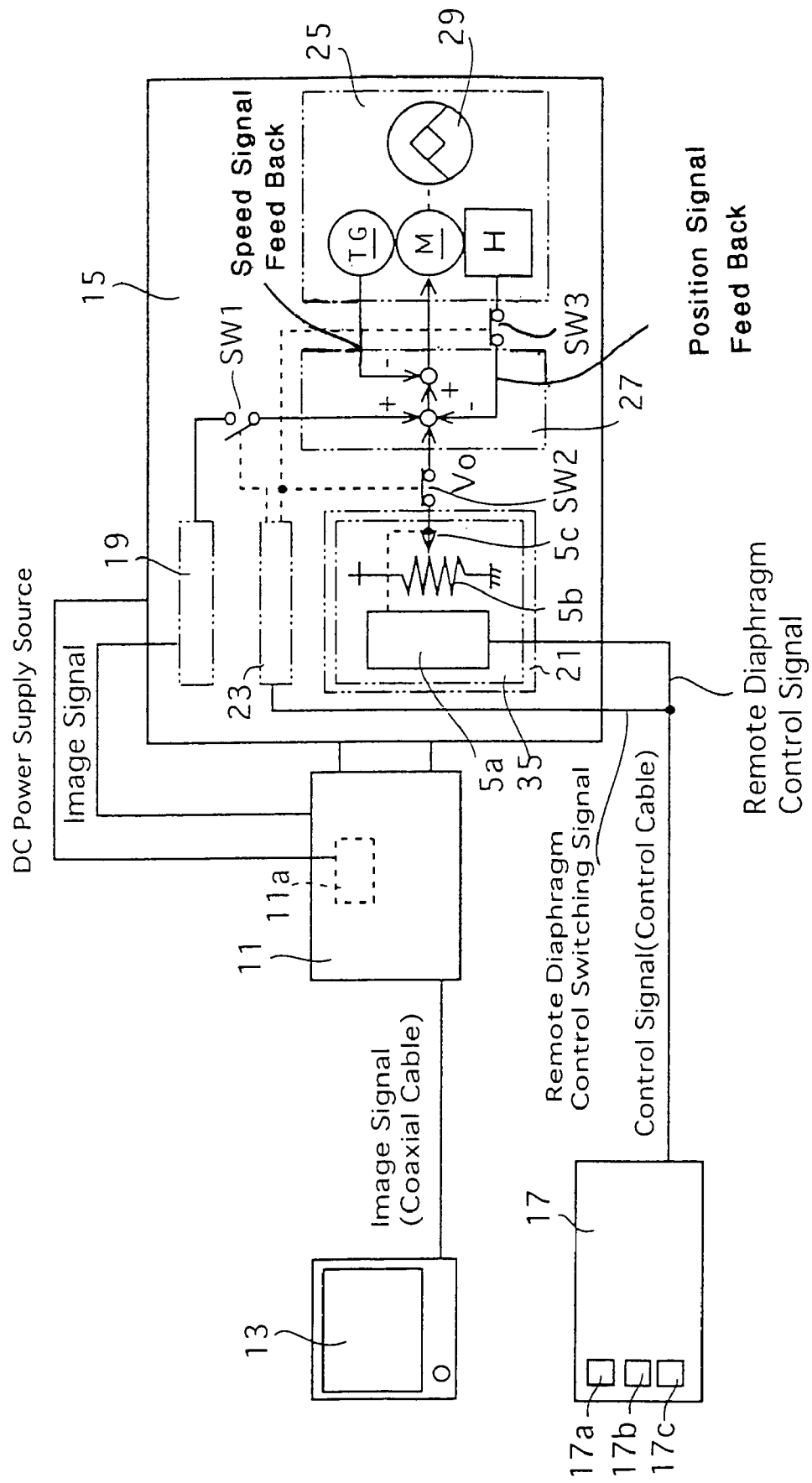
FIG. 1 is a block diagram of an embodiment of main parts of a CCTV camera to which the present invention is applied.

FIG. 1 is a block diagram of an embodiment of main parts of a CCTV camera according to the present invention. The CCTV camera 11 is provided with a camera lens 15 mounted thereto.

The CCTV camera 11 receives an image of an object through a CCD image pickup device of the camera lens 15 (photographing lens is not shown) for the CCTV camera 11 and outputs an electric image signal.

A CCTV monitor 13 is connected to the CCTV camera 11 through a coaxial cable to receive the image signals from the CCTV camera 11 and display an image in a CRT, etc. A user can check the state of the image picked up by the CCTV camera 11 while looking at the CCTV monitor 13.

The CCTV camera lens 15 selectively carries out an automatic diaphragm control in which a diaphragm 29 is controlled in accordance with the image signal (brightness signal) output from the CCTV camera 11 in accordance with a control signal supplied from an external remote controller (remote diaphragm control device) 17, and a remote diaphragm control in which the diaphragm 29 can be set at an optional position in accordance with a remote diaphragm control signal output from the external remote controller 17, regardless of the image signal of the CCTV camera 11.

The CCTV camera lens 15 operates upon receipt of DC power supplied from a power source 11a of the CCTV camera 11.

The CCTV camera lens 15 is provided therein with an automatic diaphragm control circuit (automatic control device) 19, a remote diaphragm control circuit 21, an auto/manual switching circuit (switching device) 23, a servo meter 25, and a servo circuit 27. The automatic diaphragm control circuit 19, the remote diaphragm control circuit 21, the auto/manual switching circuit 23, the servo meter 25, the servo circuit 27, and the power source 11a constitute a diaphragm control apparatus for the CCTV camera lens 15. When the diaphragm control signal is supplied to the servo meter 25, a diaphragm drive meter (diaphragm drive device) M drives the diaphragm 29 in a stop-down direction or an open direction in accordance with the control signal supplied thereto. The diaphragm 29 is normally biased by a spring in a closing direction, so that the diaphragm 29 is closed at an initial position when no power is supplied to the diaphragm drive meter M.

In the servo meter 25, in addition to the diaphragm drive meter M for driving the diaphragm 29, etc., a tacho-generator TG is provided to keep the drive speed of the drive meter M (referred to as the diaphragm speed) constant, and a position detection device H to detect the position of the diaphragm 29. Note that the position detection device H includes a Hall-effect device in the illustrated embodiment.

The servo circuit 27 is a drive control circuit for the diaphragm drive meter M and is provided with a drive function to supply a drive signal corresponding to the control signal output from the automatic diaphragm control circuit 19 or the remote diaphragm control circuit 21, to the diaphragm drive meter M to drive the same, and a hold function to electrically retain the diaphragm at a predetermined position corresponding to the remote diaphragm control signal, in accordance with the position detection signal fed back from the position detection device H, upon remote diaphragm control.

The automatic diaphragm control circuit 19 rectifies the image signal (brightness signal) input from the CCTV camera 11 and outputs the automatic diaphragm control signal to the servo circuit 27 to control the drive of the diaphragm drive meter M.

The remote diaphragm control circuit 21 amplifies the signal set in accordance with the remote diaphragm adjustment signal input from the external remote controller 17, and outputs a position voltage V0 to the servo circuit 27 as a remote diaphragm control signal.

The auto/manual switching circuit 23 is adapted to switch the automatic diaphragm control by the automatic diaphragm control circuit 19 to the remote diaphragm control by the external remote controller 17, in response to a remote control switching signal from the external remote controller 17. When a remote control switching signal is not issued from the external remote controller 17, the auto/manual switching circuit 23 opens the switches SW2 and SW3 and closes the switch SW1 to connect the automatic diaphragm control circuit 19 and the servo circuit 27 in order to carry out the automatic diaphragm control in which the diaphragm 29 is controlled in accordance with the image signal supplied from the CCTV camera 11. When the remote control switching signal is issued from the external remote controller 17, the auto/manual switching circuit 23 opens the switch SW1 to disconnect the automatic diaphragm control circuit 19 and the servo circuit 27 and closes the switches SW2 and SW3 to connect the remote diaphragm control circuit 21 and the servo circuit 27 in order to carry out the remote diaphragm control in which the diaphragm 29 is controlled in accordance with the remote control switching signal supplied from the external remote controller 17.

The external remote controller 17 outputs the remote control switching signal so that the CCTV camera lens 15 carries out the remote diaphragm control and the remote diaphragm adjustment signal so that the CCTV camera lens 15 can optionally set the diaphragm. The external remote controller 17 outputs these signals when the remote control selection switch (switching signal output device) 17a, the diaphragm opening switch 17b and the stop-down switch 17c provided therein are actuated. Note that in the CCTV camera lens 15 in the illustrated embodiment, the automatic diaphragm control is carried out when no remote control switching signal is issued from the external remote controller 17, and the remote diaphragm control is carried out while the remote control switching signal is received.

However, it is possible to switch the control mode each time the remote control switching signal or the automatic control switching signal is issued from the external remote controller 17.

Figure 2:
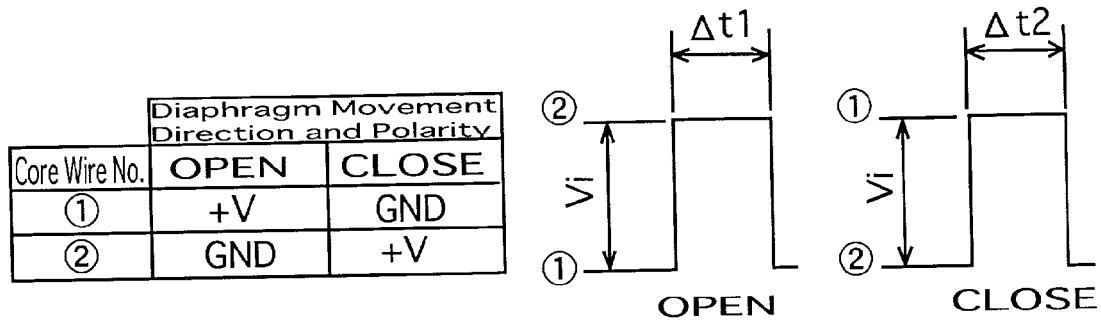
FIG. 2 shows a wave shape of a remote diaphragm control signal output from an external remote controller in the form of a polarity switching system.
Figure 3:
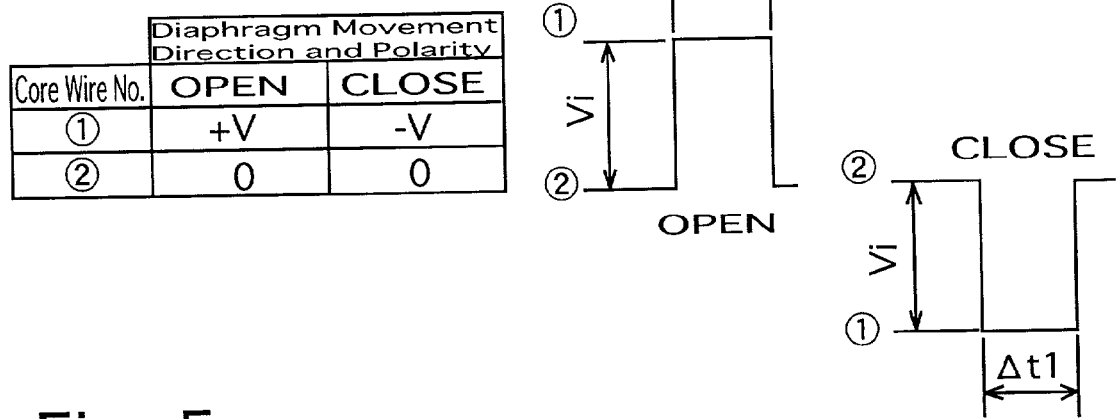
FIG. 3 shows a wave shape of a remote diaphragm control signal output from an external remote controller in the form of a common system.

There are typically two output systems for a diaphragm control signal from the external remote controller 17, i.e., a polarity switching system of which the signal wave shape is shown in FIG. 2 and a common system of which the signal wave shape is shown in FIG. 3, respectively. The polarity switching system is also called a single power source system, wherein the polarity of the voltage applied to the diaphragm drive meter M is changed by a single power source (Voltage V) to control the drive direction of the diaphragm 29. The common system is also called a dual power source system, wherein assuming that a reference voltage is 0, two power sources (voltages +V, −V) are used, so that the voltage to be applied to the diaphragm drive meter M is switched to +V or −V to control the drive direction of the diaphragm 29. In the illustrated embodiment, the diaphragm control signal is output according to the common system shown in FIG. 3, i.e., a diaphragm opening control signal +Vi to open the diaphragm 29 or a stop-down control signal −Vi to move the diaphragm 29 in the closing direction is supplied to the lens 15 for the CCTV camera.

Figure 4:
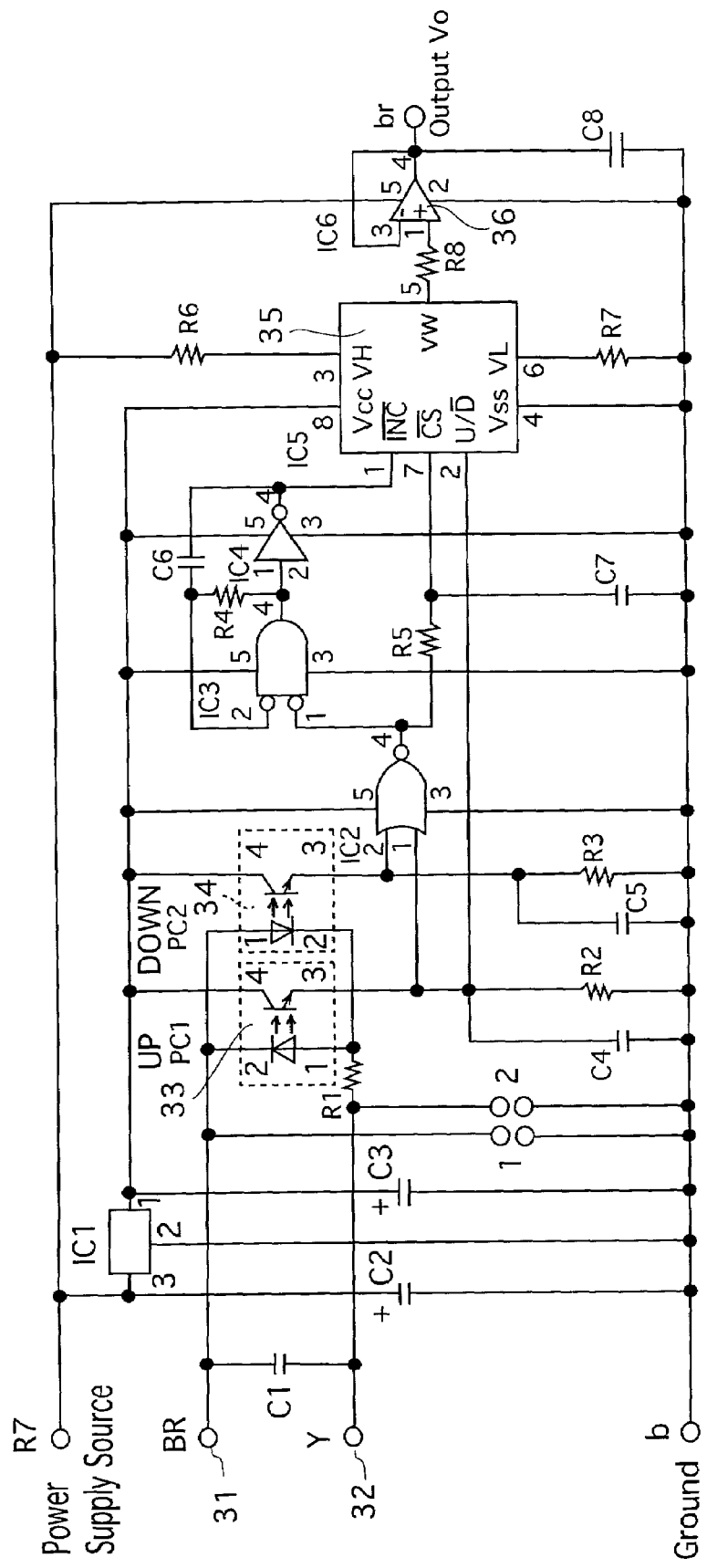
FIG. 4 is an electric circuit diagram of an A/D converter provided in a lens of a CCTV camera, by way of example.

FIG. 4 shows an example of the remote diaphragm control circuit 21 according to the present invention. In case of a control mode using a polarity switching system, the stop-down control signal −Vi output from the external remote controller 17 is input at an input terminal 31 to the remote diaphragm control circuit 21, with the signal voltage at an input terminal 32 being a reference voltage, to activate a photo-transistor 34 and is output to a digital potentiometer (diaphragm control signal setting device) 35. Likewise, the diaphragm opening control signal +Vi output from the external remote controller 17 is input at the input terminal 32 to the remote diaphragm control circuit 21, with the signal voltage at the input terminal 31 being a reference voltage, to activate a photo-transistor 33 and is output to the digital potentiometer 35.

The digital potentiometer 35 has a signal setting function to set a remote diaphragm control signal in accordance with the input stop-down control signal −Vi or the input diaphragm opening control signal +Vi, and a memory function to store the set remote diaphragm control signal. The digital potentiometer 35 is provided therein with an EEPROM (non-volatile memory) 5a, a variable resistor 5b, and a wiper 5c which is in sliding contact with the variable resistor 5b and which divides and outputs the input voltage of the variable resistor 5b, in accordance with the contact position (FIG. 1). The digital potentiometer 35 is constructed so that the wiper 5c operates to vary the contact position (referred to as a wiper position) with the variable resistor 5b and output a divided voltage corresponding to the wiper position as a remote diaphragm control signal every time the stop-down control signal −Vi or the diaphragm opening control signal +Vi is input, and that the value corresponding to the wiper position of the variable resistor 5b is rewritten and stored in the EEPROM 5a.

Figure 5:
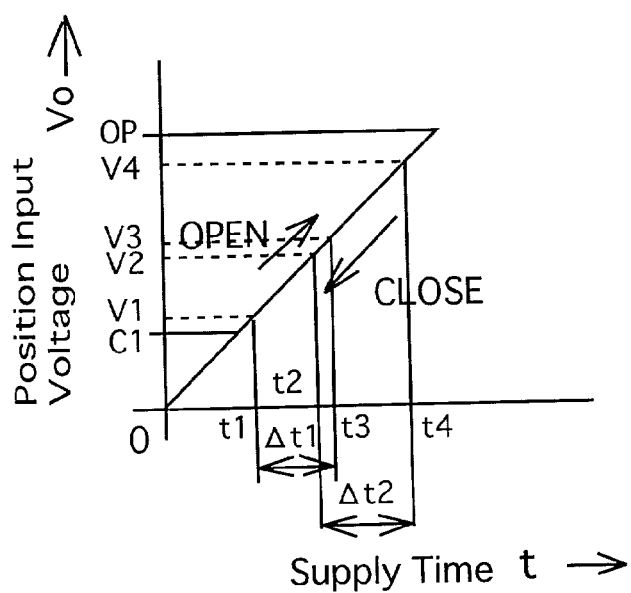
FIG. 5 is a diagram showing a relationship between a supply time t of a remote diaphragm control signal and a position input voltage V0.

FIG. 5 shows a relationship between the supply time t of the remote diaphragm control circuit 21 and the position input voltage V0. The position input voltage V0 represents the DC voltage output from the remote diaphragm control circuit 21 to the servo circuit 27, i.e., the remote diaphragm control signal output from the digital potentiometer 35 and amplified by the operational amplifier 36.

When the diaphragm opening control signal +Vi is supplied to the remote diaphragm control circuit 21, the position input voltage V0 is increased in direction proportion to the supply time Δt. For instance, if the diaphragm opening control signal +Vi is supplied for the time from t1 to t3, the position input voltage V0 is increased from V1 to V3, so that the diaphragm 29 is moved in the open direction. Note that when the position input voltage V0 is identical to the maximum diaphragm voltage Op, the diaphragm 29 is moved to the maximum diaphragm position.

When the stop-down control signal −Vi is supplied to the remote diaphragm control circuit 21, the position input voltage V0 is decreased in direct proportion to the supply time Δt. For instance, if the stop-down control signal −Vi is supplied for the time from t4 to t2, the position input voltage V0 is decreased from V4 to V2, so that the diaphragm 29 is moved in the stop-down direction. Note that when the position input voltage V0 is identical to the minimum diaphragm voltage C1, the diaphragm 29 is moved to the minimum diaphragm position.

As can be understood from the foregoing, the remote diaphragm control signal is set by varying the wiper position of the variable resistor 5b of the potentiometer 35. In the illustrated embodiment, the digital potentiometer 35 is constructed so that the wiper position of the variable resistor 5b is varied only when the remote diaphragm control signal is input, and once the supply of the remote diaphragm control signal is stopped, the wiper position of the variable resistor 5b at that time is held and the value corresponding to the wiper position of the variable resistor 5b is rewritten and stored in the EEPROM 5a. Consequently, if the power supply from the CCTV camera 11 (power source 11a) is interrupted, no change in the stored value corresponding to the wiper position of the variable resistor 5b takes place. If the power supply from the CCTV camera 11 begins, the digital potentiometer 35 reads the value corresponding to the wiper position of the variable resistor 5b, stored in the EEPROM 5a to reset the wiper position of the variable resistor 5b, so that the position input voltage V0 corresponding to the wiper position of the variable resistor 5b is output to the servo circuit 27. Thus, the diaphragm 29 is automatically returned to the diaphragm position in which the diaphragm was located when the power supply was interrupted.

The diaphragm control operation of the apparatus constructed as above will be discussed below. It is assumed that power is supplied from the CCTV camera 11 to the CCTV camera lens 15.

The automatic diaphragm control will be first explained. During the automatic diaphragm control mode, an automatic control signal is supplied from the external remote controller 17 to the auto/manual switching circuit 23, so that the automatic diaphragm control mode is set. Namely, the switches SW2 and SW3 are disconnected (opened) by the auto/manual switching circuit 23, and the switch SW1 is connected (closed). Consequently, the automatic diaphragm control signal obtained by rectifying the image signal of the CCTV camera 11 is supplied from the automatic control circuit (digital potentiometer) 35 to the diaphragm drive meter M through the servo circuit 27. When the diaphragm drive meter M begins driving in response to the automatic diaphragm control signal, the speed control signal is fed back from the tacho-generator TG to the diaphragm drive meter M through the servo circuit 27. Consequently, the diaphragm 29 is moved in the closing or opening direction at a constant diaphragm speed. When the diaphragm is moved to a diaphragm position corresponding to the brightness of the image signal, the diaphragm is retained in the diaphragm position.

The remote diaphragm control will be explained below. When the power is supplied from the CCTV camera 11, the digital potentiometer 35 resets the wiper position of the variable resistor 5b when the diaphragm was moved in accordance with the remote diaphragm control signal immediately before the interruption of the power supply, regardless of the automatic diaphragm control mode or the remote diaphragm control mode. In the remote diaphragm control mode, the remote diaphragm switching signal and the remote diaphragm control signal are output from the external remote controller 17 to the auto/manual switching circuit 23 and the remote diaphragm control circuit 21. Consequently, the switch SW1 is opened and the switches SW2 and SW3 are closed by the auto/manual switching circuit 23 to set the remote diaphragm control mode. In the remote diaphragm control circuit 21, the digital potentiometer 35 varies the position of the wiper 5c in accordance with the input remote diaphragm control signal, so that the remote diaphragm control signal is set corresponding to the voltage at the wiper position. The remote diaphragm control signal is amplified by the operational amplifier 36 and is supplied to the servo circuit 27 as a position input voltage V0. When the supply of the remote diaphragm control signal is interrupted, the wiper position of the variable resistor 5b at the interruption is held and the value corresponding to the wiper position is rewritten and stored in EEPROM 5a. The position input voltage V0 corresponding to the held wiper position is supplied to the servo circuit 27 until the remote diaphragm control signal is input again.

The diaphragm drive meter M begins driving in response to the remote diaphragm control signal from the servo circuit 27, the speed control signal from the tacho-generator TG and the position detection signal from the position detection device H are fed back to the diaphragm drive meter M through the servo circuit 27. Consequently, the diaphragm drive meter M drives the diaphragm 29 at a constant diaphragm speed in the opening or stop-down direction until the position input voltage V0 and the position detection signal (voltage) balance. The diaphragm 29 is held in a balance position in which the position input voltage V0 and the position detection signal (voltage) balance.

The above discussion has been addressed to the diaphragm control operation when the power is supplied from the CCTV camera 11. The following discussion will be addressed to the diaphragm control operation when the power supply from the CCTV camera 11 is interrupted.

In the automatic diaphragm control mode, the diaphragm position of the diaphragm 29 is set in accordance with the image signal from the CCTV camera 11. Therefore, if the power supply from the CCTV camera 11 is restarted after interruption, the position of the diaphragm 29 is automatically set in accordance with the image signal of the CCTV camera 11.

In the remote diaphragm control mode, since the position of the diaphragm 29 is electrically set and maintained in accordance with the position input voltage V0 from the remote diaphragm control circuit 21 and the position detection signal from the position detection device H, the diaphragm 29 is closed if the power supply from the CCTV camera 11 is interrupted. However, in the digital potentiometer 35 according to the illustrated embodiment, the value corresponding to the wiper position of the variable resistor 5b is continuously stored in the EEPROM 5a even if the power supply is interrupted, i.e., the wiper position is varied only when the power is supplied and the remote diaphragm control signal is input. Thus, even if the power supply is interrupted, the value corresponding to the wiper position of the variable resistor 5b can be maintained. When the power supply is restarted, the digital potentiometer 35 reads the stored value corresponding to the wiper position of the variable resistor 5b from the EEPROM 5a, and resets the wiper 5c to the wiper position of the variable resistor 5b when the power supply was interrupted. Consequently, if the power supply from the CCTV camera 11 is supplied again, the remote diaphragm control signal corresponding to the wiper position maintained by the digital potentiometer 35, i.e., the position input voltage V0 is supplied to the servo circuit 27, so that the diaphragm 29 is automatically returned to the diaphragm position when the power supply was interrupted.

Although the digital potentiometer 35 having an EEPROM incorporated therein as a diaphragm memory at the remote diaphragm control mode is employed in the illustrated embodiment, the present invention is not limited thereto. For instance, a combination of a mechanical motor and potentiometer can be used as a memory for storing the diaphragm control signal when the power supply is interrupted or stopped.

As can be understood from the above discussion, according to the present invention, the diaphragm control signal setting device (digital potentiometer 35) for setting the diaphragm control signal, which is adapted to control the opening or closing movement of the diaphragm in response to the remote diaphragm control signal from the remote diaphragm control device, stores therein the diaphragm control signal when the power supply is interrupted and outputs the diaphragm control signal set at the interruption of the power supply when the power supply is restarted. Therefore, if the power supply which has been interrupted is recommenced, the diaphragm control signal is the same as when the power was interrupted can be output, and thus it is possible to maintain the remotely set diaphragm position, in spite of the interruption of the power supply.

In the present invention in which the digital potentiometer 35 having therein a non-volatile memory (EEPROM 5a) is provided, the digital potentiometer 35 varies the wiper position of the variable resistor 5b when the remote diaphragm control signal is input thereto to output a remote diaphragm control signal corresponding to the wiper position; maintains the wiper position when the input of the remote diaphragm control signal is stopped; stores the wiper position in the non-volatile memory and outputs the remote diaphragm control signal. Consequently, if the power supply is interrupted, the value corresponding to the wiper position of the variable resistor stored in the non-volatile memory does not change. Therefore, when the power supply begins again, the digital potentiometer 35 reads the value corresponding to the wiper position of the variable resistor 5b, stored in the non-volatile memory and supplies the remote diaphragm control signal corresponding to the wiper position to the diaphragm drive device (diaphragm drive meter M) to thereby automatically return the diaphragm to the diaphragm position when the power supply was interrupted. Consequently, it is not necessary for user to reset the diaphragm each time the power is turned ON.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A diaphragm control apparatus for a lens of a CCTV camera having a diaphragm driving device that at least one of opens and closes a diaphragm, comprising:

a remote diaphragm control device that selects one of an automatic diaphragm control mode in which said diaphragm is controlled in accordance with an image signal output from said CCTV camera, and a remote diaphragm control mode in which said diaphragm is set to an optional position in accordance with a remote diaphragm control signal issued from said remote diaphragm control device;

a diaphragm control signal setting device that is activated when said remote diaphragm control mode is selected by said remote diaphragm control device, said diaphragm control signal setting device being configured to generate a diaphragm control signal in accordance with said remote diaphragm control signal issued from said remote diaphragm control device, said diaphragm control signal setting device further being configured to output said diaphragm control signal to said diaphragm driving device to move said diaphragm to a position corresponding to said diaphragm control signal; and a power source that supplies electrical power to said diaphragm control signal setting device, wherein said diaphragm control signal setting device includes a memory that stores said diaphragm control signal when the electrical power to said diaphragm control signal setting device is interrupted, said diaphragm control signal being output from said memory to set said diaphragm to said optional position when the electrical power is re-supplied, said diaphragm control signal setting device comprising a digital potentiometer and said memory, said digital potentiometer varying a wiper position of a variable resistor and outputting said remote diaphragm control signal corresponding to said wiper position only when said remote diaphragm control signal is input when the electrical power is supplied, said digital potentiometer maintaining said wiper position of said variable resistor when said remote diaphragm control signal is stopped, a value corresponding to said wiper position being stored in said memory when the electrical power is interrupted, the value being read from said memory when the electrical power is re-supplied to recommence the output of said remote diaphragm control signal, wherein said memory is provided in the lens of the CCTV camera.

2. The diaphragm control apparatus of claim 1, wherein said memory comprises a non-volatile memory.

3. The diaphragm control apparatus of claim 1, wherein said remote diaphragm control device is provided separately from the CGTV camera.

4. The diaphragm control apparatus of claim 1, wherein said CCTV camera lens comprises an automatic control device that outputs said diaphragm control signal based on an image signal of said CCTV camera to the diaphragm driving device to thereby automatically control the diaphragm, and a switching device that switches between said automatic diaphragm control mode and said remote diaphragm control mode, said remote diaphragm control device being provided with a switching signal output device that operates said switching device.

* * * * *